United States Patent
Zhao et al.

(10) Patent No.: US 9,515,766 B2
(45) Date of Patent: Dec. 6, 2016

(54) NODE APPARATUS

(71) Applicant: Huawei Technologies Co., Ltd., Shenzhen (CN)

(72) Inventors: Han Zhao, Shenzhen (CN); Liangjia Zong, Shenzhen (CN); Ning Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/882,107

(22) Filed: Oct. 13, 2015

(65) Prior Publication Data
US 2016/0036553 A1 Feb. 4, 2016

Related U.S. Application Data

(63) Continuation of application No. PCT/CN2013/074271, filed on Apr. 16, 2013.

(51) Int. Cl.
*H04B 10/032* (2013.01)
*H04Q 11/00* (2006.01)
*H04J 14/02* (2006.01)

(52) U.S. Cl.
CPC ......... *H04J 14/0297* (2013.01); *H04B 10/032* (2013.01); *H04J 14/0212* (2013.01);
(Continued)

(58) Field of Classification Search
CPC H04J 14/0297; H04J 14/0221; H04J 14/0212; H04B 10/032; H04Q 11/0066; H04Q 11/0005; H04Q 2011/0081; H04Q 2011/0016; H04Q 2011/0015
(Continued)

(56) References Cited

U.S. PATENT DOCUMENTS 8,218,967 B1 7/2012 Stevens
2003/0138252 A1 7/2003 Paiam et al.
(Continued)

FOREIGN PATENT DOCUMENTS

CN 101610129 A 12/2009
CN 102640438 A 8/2012
WO WO 2011133254 A2 10/2011

OTHER PUBLICATIONS

Thiagarajan et al., "Direction-Independent Add/Drop Access for Multi-Degree ROADMs," Optical Fiber communication/ National Fiber Optic Engineers Conference, Institute of Electrical and Electronics Engineers, New York, New York (2008).
(Continued)

*Primary Examiner* — Leslie Pascal
(74) *Attorney, Agent, or Firm* — Leydig, Voit & Mayer, Ltd.

(57) ABSTRACT

The present invention provides a node apparatus, where two N×N wavelength selective switches are used to form a parallel-connected structure, and two ends of each power splitter are separately connected to input ends of the N×N wavelength selective switches, and two ends of each power combiner are separately connected to output ends of the N×N wavelength selective switches, thereby transferring route switching selection work originally performed between multiple 1×M wavelength selective switches to the inside of the N×N wavelength selective switch for implementation. Compared with an original structure using discrete components, the node apparatus is simplified, and when a traffic volume expands, the number of module slots on a line side does not need to be increased, thereby reducing usage costs eventually. The present invention is used for signal transmission in a node.

7 Claims, 7 Drawing Sheets (52) U.S. Cl.
CPC ...... *H04J 14/0221* (2013.01); *H04Q 11/0005* (2013.01); *H04Q 11/0066* (2013.01); *H04Q 2011/0015* (2013.01); *H04Q 2011/0016* (2013.01); *H04Q 2011/0081* (2013.01)

(58) Field of Classification Search
USPC .................................................. 398/5, 7, 48
See application file for complete search history.

(56) References Cited

U.S. PATENT DOCUMENTS

| | | |
|---|---|---|
| 2008/0138068 A1 | 6/2008 | Akiyama et al. |
| 2008/0260383 A1 | 10/2008 | Zhong et al. |
| 2009/0175620 A1 | 7/2009 | Bhatnagar et al. |
| 2009/0180779 A1 | 7/2009 | Boduch et al. |
| 2010/0142961 A1 | 6/2010 | Wisseman et al. |
| 2010/0202778 A1 | 8/2010 | Wisseman et al. |
| 2011/0222862 A1 | 9/2011 | Boertjes et al. |
| 2012/0114332 A1 | 5/2012 | Zhang et al. |

OTHER PUBLICATIONS

Devarajan et al., "Colorless, Directionless and Contentionless multi-degree ROADM architecture for mesh optical networks," Second International Conference on Communication Systems and Networks, Institute of Electrical and Electronics Engineers, New York, New York (2010).

Ji et al., "Colorless and Directionless Multi-Degree Reconfigurable Optical Add/Drop Multiplexers," The $19^{th}$ Annual Wireless and Optical Communications Conference, Institute of Electrical and Electronics Engineers, New York, New York (2010).

Jensen et al., "Colourless, Directionless, Contentionless ROADM Architecture Using Low-Loss Optical Matrix Switches," $36^{th}$ European Conference and Exhibition on Optical Communication, Institute of Electrical and Electronics Engineers, New York, New York (2010).

Jensen et al., "Highly Scalable OXC-based Contentionless ROADM Architecture with Reduced Network Implementation Costs," Optical Fiber Communication Conference and Exposition/ National Fiber Optic Engineers Conference, Institute of Electrical and Electronics Engineers, New York, New York (2012).

NODE APPARATUS

CROSS-REFERENCE TO RELATED APPLICATIONS

This application is a continuation of International Patent Application No. PCT/CN2013/074271, filed on Apr. 16, 2013, which is hereby incorporated by reference in its entirety.

TECHNICAL FIELD

The present invention relates to the communications field, and in particular, to a node apparatus.

BACKGROUND

Currently, a reconfiguration optical add/drop multiplexer (Reconfiguration Optical Add/drop Multiplexer, ROADM) has become a main implementation technology of an optical network node, where the ROADM can provide a remote control reconfiguration capability for a node, and implement intelligent wavelength-level service scheduling of the node.

At present, in a ROADM node, using discrete components is a common implementation form. A node is established by interconnecting multiple 1×M wavelength selective switches, so as to implement route switching selection of different signals. When a traffic volume of a network increases, the number of 1×M wavelength selective switches needs to be increased to improve a service switching capability in the node. However, in this way, the number of module slots needs to be greatly increased in an existing device, so as to connect multiple 1×M wavelength selective switches, which increases device costs, and results in a sharp increase in costs as the traffic volume expands.

SUMMARY

The present invention provides a node apparatus, which can use an N×N wavelength selective switch to replace an original discrete 1×M wavelength selective switch, thereby transferring route switching selection work originally performed between multiple 1×M wavelength selective switches to the inside of the N×N wavelength selective switch for implementation. Compared with an original structure using discrete components, the node apparatus is simplified, and when a traffic volume expands, the number of module slots on a line side does not need to be increased, thereby reducing usage costs eventually.

To achieve the foregoing objective, embodiments of the present invention use the following technical solutions:

According to a first aspect, the present invention provides a node apparatus, and the node apparatus includes: a first N×N wavelength selective switch, a second N×N wavelength selective switch, at least one power splitter, and at least one power combiner, where the node apparatus includes:

the first N×N wavelength selective switch and the second N×N wavelength selective switch form a parallel-connected structure, each power splitter has one input end and two output ends, and the two output ends are a first output end and a second output end; the first output end of each power splitter is connected to a different input end of the first N×N wavelength selective switch, and the second output end of each power splitter is connected to a different input end of the second N×N wavelength selective switch; each power combiner has two input ends and one output end, and the two input ends are a first input end and a second input end; and the first input end of each power combiner is connected to one output end of the first N×N wavelength selective switch, and the second input end of each power combiner is connected to one output end of the second N×N wavelength selective switch, where N is a natural number greater than 1; and each power splitter sends, by using the first output end, a signal including a working service and a backup service to the first N×N wavelength selective switch, each power splitter sends, by using the second output end, the signal including the working service and the backup service to the second N×N wavelength selective switch, the first N×N wavelength selective switch blocks the backup service in the signal, switches the working service, and sends the working service to the power combiner by using the first input end of the power combiner, and the second N×N wavelength selective switch blocks the working service in the signal, switches the backup service, and sends the backup service to the power combiner by using the second input end of the power combiner.

In a first possible implementation manner, with reference to the first aspect, the node apparatus further includes:

a first transmitter and a first power splitter, where an output end of the first transmitter is connected to an input end of the first power splitter, and output ends of the first power splitter are separately connected to the $N^{th}$ input port of the first N×N wavelength selective switch and the $N^{th}$ input port of the second N×N wavelength selective switch; the first transmitter is configured to send a service signal, so that the service signal enters the first power splitter, and separately enters the $N^{th}$ input port of the first N×N wavelength selective switch and the $N^{th}$ input port of the second N×N wavelength selective switch from the output ends of the first power splitter; and the $N^{th}$ input port of the first N×N wavelength selective switch is an input port except an input port, which is connected to the at least one power splitter, of the first N×N wavelength selective switch, and the $N^{th}$ input port of the second N×N wavelength selective switch is an input port except an input port, which is connected to the at least one power splitter, of the second N×N wavelength selective switch.

In a second possible implementation manner, with reference to the first aspect, the node apparatus further includes:

a first receiver and a first switch, where two input ends of the first switch are separately connected to the $N^{th}$ output port of the first N×N wavelength selective switch and the $N^{th}$ output port of the second N×N wavelength selective switch, an input end of the first receiver is connected to an output end of the first switch, the first receiver is configured to receive a working service signal from the $N^{th}$ output port of the first N×N wavelength selective switch or a backup service signal from the $N^{th}$ output port of the second N×N wavelength selective switch; and the $N^{th}$ output port of the first N×N wavelength selective switch is an output port except an output port, which is connected to the at least one power combiner, of the first N×N wavelength selective switch, and the $N^{th}$ output port of the second N×N wavelength selective switch is an output port except an output port, which is connected to the at least one power combiner, of the second N×N wavelength selective switch.

In a third possible implementation manner, with reference to the first aspect, the node apparatus further includes:

a second transmitter, a third transmitter, a second receiver, a third receiver, a second power splitter, a third power splitter, a second switch, a third switch, a second 1×L wavelength selective switch, a third 1×L wavelength selective switch, a second 1×R power splitter, and a third 1×R power splitter, where an output end of the second transmitter is connected to an input end of the second power splitter, output ends of the second power splitter are separately connected to one port at an input end of the second 1×L wavelength selective switch and one port at an input end of the third 1×L wavelength selective switch, an output end of the second 1×L wavelength selective switch is connected to the $N^{th}$ port of the first N×N wavelength selective switch, and an output end of the third 1×L wavelength selective switch is connected to the $N^{th}$ port of the second N×N wavelength selective switch; and the second transmitter is configured to send a service signal, so that the service signal passes through the second power splitter, the second 1×L wavelength selective switch and the third 1×L wavelength selective switch, and enters the first N×N wavelength selective switch and the second N×N wavelength selective switch, where L is a natural number greater than 1;

an output end of the third transmitter is connected to an input end of the third power splitter, output ends of the third power splitter are separately connected to one of remaining ports, except an occupied port, at the input end of the second 1×L wavelength selective switch, and one of remaining ports, except an occupied port, at the input end of the third 1×L wavelength selective switch; and the third transmitter is configured to send a service signal, so that the service signal passes through the third power splitter, the second 1×L wavelength selective switch, and the third 1×L wavelength selective switch, and enters the first N×N wavelength selective switch and the second N×N wavelength selective switch;

an input end of the second 1×R power splitter is connected to the $N^{th}$ port at the output end of the first N×N wavelength selective switch, one port at an output end of the second 1×R power splitter is connected to an input end of the second switch, an output end of the second switch is connected to an input end of the second receiver, and one of remaining ports, except an occupied port, at the output end of the second 1×R power splitter is connected to an input end of the third switch; and the second receiver is configured to selectively receive, by using the second switch, a working service signal from the $N^{th}$ output port of the first N×N wavelength selective switch or a backup service signal from the $N^{th}$ output port of the second N×N wavelength selective switch, where R is a natural number greater than 1;

an input end of the third 1×R power splitter is connected to the $N^{th}$ port at an output end of the second N×N wavelength selective switch, one port at an output end of the third 1×R power splitter is connected to an input end of the second switch, one of remaining ports, except an occupied port, at the output end of the third 1×R power splitter is connected to an input end of the third switch, and an output end of the third switch is connected to an input end of the third receiver; and the third receiver is configured to selectively receive, by using the third switch, a backup service signal from the $N^{th}$ output port of the second N×N wavelength selective switch or a working service signal from the $N^{th}$ output port of the first N×N wavelength selective switch; and the $N^{th}$ output port of the first N×N wavelength selective switch is an output port except an output port, which is connected to the at least one power combiner, of the first N×N wavelength selective switch, and the $N^{th}$ output port of the second N×N wavelength selective switch is an output port except an output port, which is connected to the at least one power combiner, of the second N×N wavelength selective switch.

In a fourth possible implementation manner, with reference to the first aspect, the node apparatus further includes:

a fourth transmitter, a fifth transmitter, a sixth transmitter, a seventh transmitter, a fourth power splitter, a fifth power splitter, a sixth power splitter, a seventh power splitter, a fourth 1×S power combiner, a fifth 1×S power combiner, a fourth 1×U wavelength selective switch, a fifth 1×U wavelength selective switch, a sixth 1×U wavelength selective switch, and a seventh 1×U wavelength selective switch; and a fourth receiver, a fifth receiver, a sixth receiver, a seventh receiver, a fourth switch, a fifth switch, a sixth switch, a seventh switch, a fourth 1×S wavelength selective switch, a fifth 1×S wavelength selective switch, a fourth 1×U power splitter, a fifth 1×U power splitter, a sixth 1×U power splitter, and a seventh 1×U power splitter, where an output end of the fourth transmitter is connected to an input end of the fourth power splitter, and output ends of the fourth power splitter are separately connected to one port at an input end of the fourth 1×U wavelength selective switch and one port at an input end of the sixth 1×U wavelength selective switch; an output end of the fifth transmitter is connected to an input end of the fifth power splitter, and output ends of the fifth power splitter are separately connected to one of remaining ports, except an occupied port, at the input end of the fourth 1×U wavelength selective switch and one of remaining ports, except an occupied port, at the input end of the sixth 1×U wavelength selective switch; an output end of the fourth 1×U wavelength selective switch is connected to an input end of the fourth 1×S power combiner, an output end of the sixth 1×U wavelength selective switch is connected to an input end of the fifth 1×S power combiner, an output end of the fourth 1×S power combiner is connected to the $N^{th}$ port of the first N×N wavelength selective switch, and an output end of the fifth 1×S power combiner is connected to the $N^{th}$ port of the second N×N wavelength selective switch; and the fourth transmitter is configured to send a service signal, so that the service signal passes through the fourth power splitter, the fourth 1×U wavelength selective switch and the sixth 1×U wavelength selective switch, then separately passes through the fourth 1×S power combiner and the fifth 1×S power combiner, and then separately enters the first N×N wavelength selective switch and the second N×N wavelength selective switch, and the fifth transmitter is configured to send a service signal, so that the service signal passes through the fifth power splitter, the fourth 1×U wavelength selective switch and the sixth 1×U wavelength selective switch, then separately passes through the fourth 1×S power combiner and the fifth 1×S power combiner, and then separately enters the first N×N wavelength selective switch and the second N×N wavelength selective switch, where U is a natural number greater than 1, and S is a natural number greater than 1;

an output end of the sixth transmitter is connected to an input end of the sixth power splitter, and output ends of the sixth power splitter are separately connected to one port at an input end of the fifth 1×U wavelength selective switch and one port at an input end of the seventh 1×U wavelength selective switch; an output end of the seventh transmitter is connected to an input end of the seventh power splitter, and output ends of the seventh power splitter are separately connected to one of remaining ports, except an occupied port, at the input end of the fifth 1×U wavelength selective switch and one of remaining ports, except an occupied port, at the input end of the seventh 1×U wavelength selective switch; an output end of the fifth 1×U wavelength selective switch is connected to one of remaining ports, except an occupied port, at the input end of the fourth 1×S power combiner, an output end of the seventh 1×U wavelength selective switch is connected to one of remaining ports, except an occupied port, at the input end of the fifth 1×S power combiner; and the sixth transmitter is configured to send a service signal, so that the service signal passes through the sixth power splitter, the fifth 1×U wavelength selective switch and the seventh 1×U wavelength selective switch, then separately passes through the fourth 1×S power combiner and the fifth 1×S power combiner, and then enters the first N×N wavelength selective switch and the second N×N wavelength selective switch, and the seventh transmitter is configured to send a service signal, so that the service signal passes through the seventh power splitter, the fifth 1×U wavelength selective switch, and the seventh 1×U wavelength selective switch, and then separately passes through the fourth 1×S power combiner and the fifth 1×S power combiner and enters the first N×N wavelength selective switch and the second N×N wavelength selective switch;

an input end of the fourth 1×S wavelength selective switch is connected to the $N^{th}$ port at an output end of the first N×N wavelength selective switch, one port at an output end of the fourth 1×S wavelength selective switch is connected to an input end of the fourth 1×U power splitter, output ends of the fourth 1×U power splitter are separately connected to an input end of the fourth switch and an input end of the fifth switch, an output end of the fourth switch is connected to an input end of the fourth receiver, and an output end of the fifth switch is connected to an input end of the fifth receiver; another port at the output end of the fourth 1×S wavelength selective switch is connected to an input end of the fifth 1×U power splitter, and output ends of the fifth 1×U power splitter are separately connected to an input end of the sixth switch and an input end of the seventh switch; and the fourth receiver and the fifth receiver are configured to receive a working service signal from the $N^{th}$ output port of the first N×N wavelength selective switch or a backup service signal from the $N^{th}$ output port of the second N×N wavelength selective switch;

an input end of the fifth 1×S wavelength selective switch is connected to the $N^{th}$ port at an output end of the second N×N wavelength selective switch, one port at an output end of the fifth 1×S wavelength selective switch is connected to an input end of the sixth 1×U power splitter, and output ends of the sixth 1×U power splitter are separately connected to a remaining input end, except an occupied end, of the fourth switch and a remaining input end, except an occupied end, of the fifth switch; another port at the output end of the fifth 1×S wavelength selective switch is connected to an input end of the seventh 1×U power splitter, output ends of the seventh 1×U power splitter are separately connected to a remaining input end, except an occupied end, of the six switch and a remaining input end, except an occupied end, of the seventh switch, an output end of the sixth switch is connected to an input end of the sixth receiver, and an output end of the seventh switch is connected to an input end of the seventh receiver; and the sixth receiver and the seventh receiver are configured to receive a working service signal from the $N^{th}$ output port of the first N×N wavelength selective switch or a backup service signal from the $N^{th}$ output port of the second N×N wavelength selective switch; and the $N^{th}$ output port of the first N×N wavelength selective switch is an output port except an output port, which is connected to the at least one power combiner, of the first N×N wavelength selective switch, and the $N^{th}$ output port of the second N×N wavelength selective switch is an output port except an output port, which is connected to the at least one power combiner, of the second N×N wavelength selective switch.

In a fifth possible implementation manner, with reference to the first aspect, the node apparatus further includes:

at least two upload side transmitters, at least two upload side power splitters, at least two upload side K×K switches, at least two download side receivers, at least two download side switches, at least two download side K×K switches, at least two 1×W wavelength selective switches, and at least two 1×V power splitters, where the upload side power splitters separately send, to the at least two upload side K×K switches, signals sent by the upload side transmitters, so that the signals, after being selected by the upload side K×K switches and passing through the at least two 1×W wavelength selective switches, are sent to the first N×N wavelength selective switch and the second N×N wavelength selective switch; and the at least two 1×V power splitters receive the signals from the first N×N wavelength selective switch and the second N×N wavelength selective switch, and separately send the signals to the download side K×K switches, and the signals, after being selected by the download side K×K switches and passing through the download side switches, are separately sent to the download side receivers, and finally are received by the receivers, where a value of W is a natural number greater than 1, a value of V is a natural number greater than 1, and a value of K is a natural number greater than 3.

In a sixth possible implementation manner, with reference to the first aspect, the node apparatus further includes:

at least two upload side transmitters, at least two upload side power splitters, at least two upload side K×K switches, at least two download side receivers, at least two download side switches, and at least two download side K×K switches, where the upload side power splitters separately send, to the at least two upload side K×K switches, signals sent by the upload side transmitters, so that the signals, after being selected by the upload side K×K switches, are sent to the first N×N wavelength selective switch and the second N×N wavelength selective switch, where a value of K is a natural number greater than 1; and the download side K×K switches separately receive the signals from the first N×N wavelength selective switch and the second N×N wavelength selective switch, so that the signals, after being selected by the K×K switches and passing through the download side switches, are separately sent to the download side receivers, and finally are received by the receivers, where a value of K is a natural number greater than 1.

The present invention provides a node apparatus, where two N×N wavelength selective switches are used to form a parallel-connected structure, so that the two N×N wavelength selective switches can back up for each other, and an N×N wavelength selective switch can be used to replace an original discrete 1×M wavelength selective switch, thereby transferring route switching selection work originally performed between multiple 1×M wavelength selective switches to the inside of the N×N wavelength selective switch for implementation. Compared with an original structure using discrete components, the node apparatus is simplified, and when a traffic volume expands, the number of module slots on a line side does not need to be increased, thereby reducing usage costs eventually.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
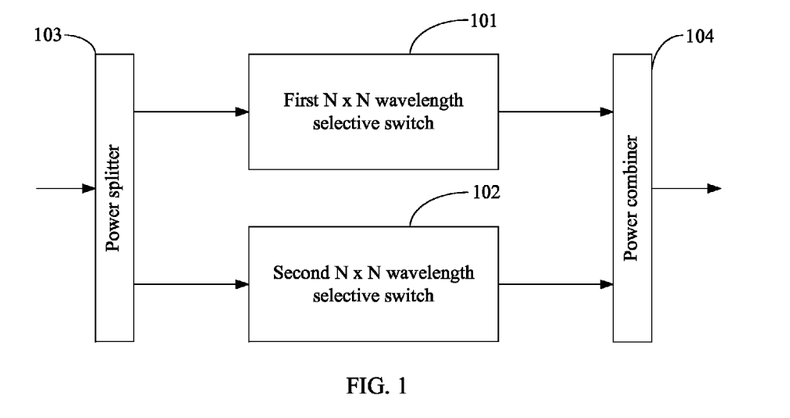
FIG. 1 is a schematic structural diagram of a node apparatus provided by an embodiment of the present invention.

The present invention provides a node apparatus, and as shown in FIG. 1, the node apparatus includes a first N×N wavelength selective switch 101, a second N×N wavelength selective switch 102, a power splitter 103, and a power combiner 104, where the node apparatus specifically includes:

The first N×N wavelength selective switch 101 and the second N×N wavelength selective switch 102 form a parallel-connected structure, each power splitter 103 has one input end and two output ends, and the two output ends are a first output end and a second output end; the first output end of each power splitter 103 is connected to a different input end of the first N×N wavelength selective switch 101, and the second output end of each power splitter 103 is connected to a different input end of the second N×N wavelength selective switch 102; each power combiner 104 has two input ends and one output end, and the two input ends are a first input end and a second input end; and the first input end of each power combiner 104 is connected to one output end of the first N×N wavelength selective switch 101, and the second input end of each power combiner is connected to one output end of the second N×N wavelength selective switch 102, where N is a natural number greater than 1; and each power splitter 103 sends, by using the first output end, a signal including a working service and a backup service to the first N×N wavelength selective switch 101, each power splitter 103 sends, by using the second output end, the signal including the working service and the backup service to the second N×N wavelength selective switch 102, the first N×N wavelength selective switch 101 blocks the backup service in the signal, switches the working service, and sends the working service to the power combiner 104 by using the first input end of the power combiner 104, and the second N×N wavelength selective switch 102 blocks the working service in the signal, switches the backup service, and sends the backup service to the power combiner by using the second input end of the power combiner 104.

An N×N wavelength selective switch has N input ports and N output ports, and by optical processing of a switching module inside the N×N wavelength selective switch, implements outputting an optical signal of any wavelength on any input port to any output port. An input/output module, a splitting/combining module, and a switching module may be included in the N×N wavelength selective switch. The switching module may be implemented by a switching engine, such as a MEMS (Micro-electro-mechanical System, micro-electro-mechanical system) micromirror array, and an LCOS (Liquid Crystal on silicon, liquid crystal on silicon).

Specifically, after a multi-wavelength signal optical beam enters the N input ports of the N×N wavelength selective switch, first, the input module performs spatial optical path adjustment on the multi-wavelength signal optical beam; the splitting module scatters signal optical beams of different wavelengths in an adjusted multi-wavelength signal optical beam in space; then the signal optical beams enter the switching module; and the switching module controls a turning angle of the MEMS micromirror array or the LCOS according to route configuration information to implement optical path steering of the signal optical beams of different wavelengths, which further implements that the signal optical beams of different wavelengths on the N input ports are switched and blocked in free space. The switched and blocked signal optical beams of different wavelengths are combined by the combining module, and finally enter the output module for spatial optical path adjustment and are output through the N output ports. Therefore, according to the route configuration information, the N×N wavelength selective switch may implement outputting an optical signal of any wavelength on any input port to any output port.

The present invention provides a node apparatus, where two N×N wavelength selective switches are used to form a parallel-connected structure, so that the two N×N wavelength selective switches can back up for each other, and an N×N wavelength selective switch can be used to replace an original discrete 1×M wavelength selective switch, thereby transferring route switching selection work originally performed between multiple 1×M wavelength selective switches to the inside of the N×N wavelength selective switch for implementation. Compared with an original structure using discrete components, the node apparatus is simplified, and when a traffic volume expands, the number of module slots on a line side does not need to be increased, thereby reducing usage costs eventually.

Figure 2:
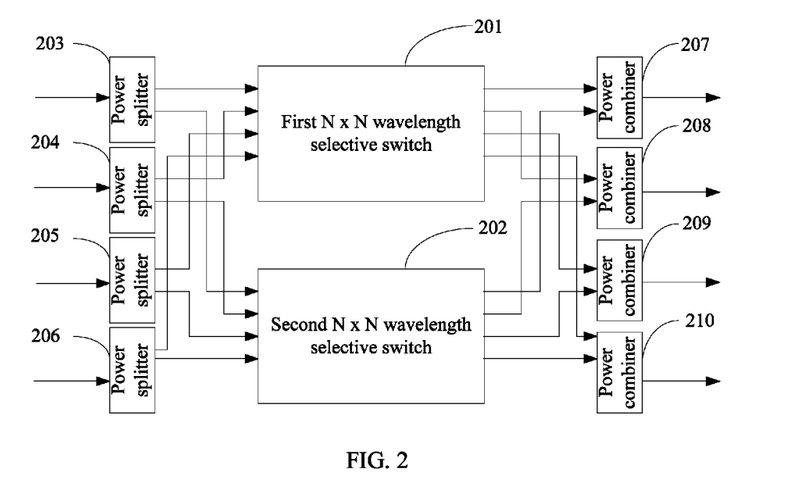
FIG. 2 is a schematic structural diagram of another node apparatus provided by an embodiment of the present invention.

An embodiment of the present invention provides a node apparatus, and as shown in FIG. 2, the node apparatus includes:

a first N×N wavelength selective switch 201, a second N×N wavelength selective switch 202, power splitters 203-206, and power combiners 207-210, where the node apparatus specifically includes:

The first N×N wavelength selective switch 201 and the second N×N wavelength selective switch 202 form a parallel-connected structure, each of N−1 input ports of the first N×N wavelength selective switch 201 and each of N−1 input ports of the second N×N wavelength selective switch 202 are connected to one of the power splitters 203-206, and each of N−1 output ports of the first N×N wavelength selective switch 201 and each of N−1 output ports of the second N×N wavelength selective switch 202 are connected to one of the power combiners 207-210, where N in this specification is a natural number greater than 1, and a value of N in this embodiment is 5. In this specification, unless otherwise specified, both the first N×N wavelength selective switch and the second N×N wavelength selective switch have the same number of ports at the input end and the output end. Reinforcement of a signal needs to be implemented by using an optical amplifier in a transmission process.

The present invention provides a node apparatus, where two N×N wavelength selective switches are used to form a parallel-connected structure, so that the two N×N wavelength selective switches can back up for each other, and an N×N wavelength selective switch can be used to replace an original discrete 1×M wavelength selective switch, thereby transferring route switching selection work originally performed between multiple 1×M wavelength selective switches to the inside of the N×N wavelength selective switch for implementation. Compared with an original structure using discrete components, the node apparatus is simplified, and when a traffic volume expands, the number of module slots on a line side does not need to be increased, thereby reducing usage costs eventually.

Figure 3:
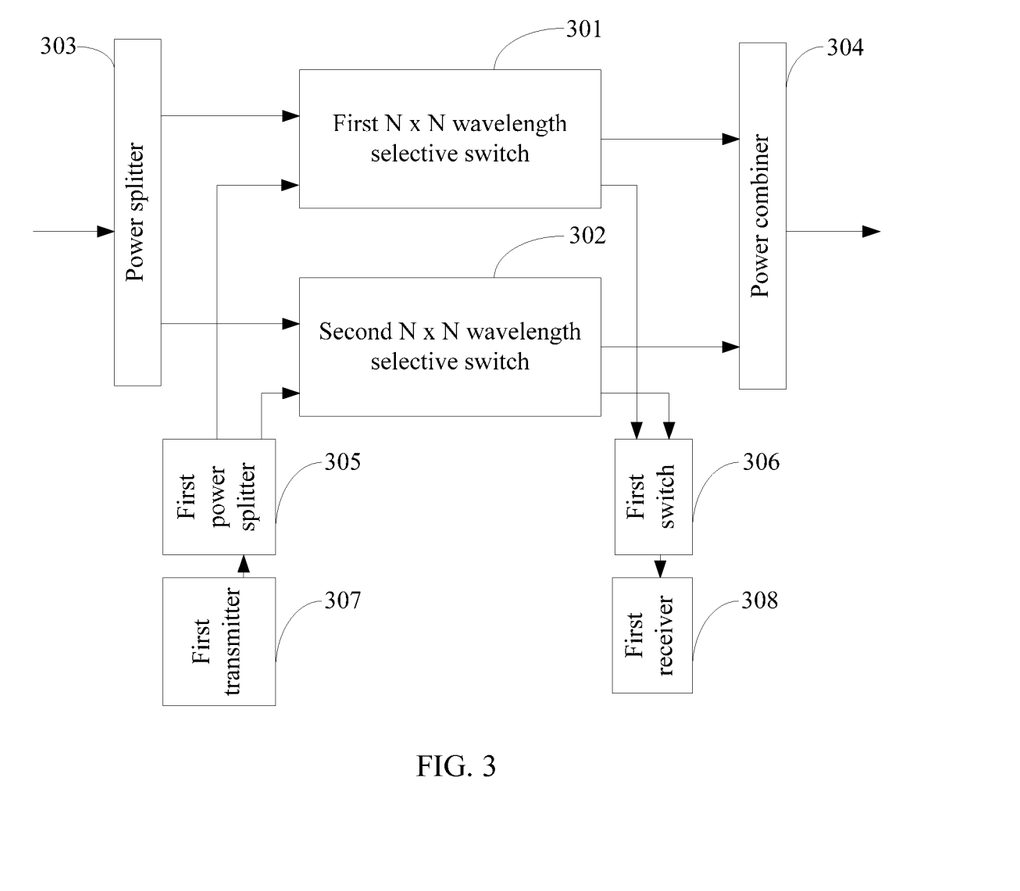
FIG. 3 is a schematic structural diagram of a node apparatus provided by an embodiment of the present invention.

An embodiment of the present invention provides a node apparatus, and as shown in FIG. 3, the node apparatus includes: a first N×N wavelength selective switch 301, a second N×N wavelength selective switch 302, a power splitter 303, a power combiner 304, a first power splitter 305, a first switch 306, a first transmitter 307, and a first receiver 308, where the node apparatus specifically includes:

An output end of the first transmitter 307 is connected to an input end of the first power splitter 305, and output ends of the first power splitter 305 are separately connected to the $N^{th}$ input port of the first N×N wavelength selective switch 301 and the $N^{th}$ input port of the second N×N wavelength selective switch 302; the first transmitter 307 is configured to send a service signal, so that the service signal enters the first power splitter 305, and separately enters the $N^{th}$ input port of the first N×N wavelength selective switch 301 and the $N^{th}$ input port of the second N×N wavelength selective switch 302 from the output ends of the first power splitter 305; and the $N^{th}$ input port of the first N×N wavelength selective switch 301 is an input port except an input port, which is connected to the at least one power splitter, of the first N×N wavelength selective switch 301, and the $N^{th}$ input port of the second N×N wavelength selective switch 302 is an input port except an input port, which is connected to the at least one power splitter, of the second N×N wavelength selective switch.

Two input ends of the first switch 306 are separately connected to the $N^{th}$ output port of the first N×N wavelength selective switch 301 and the $N^{th}$ output port of the second N×N wavelength selective switch 302, and an input end of the first receiver 308 is connected to an output end of the first switch 306. The first receiver 308 is configured to receive a working service signal from the $N^{th}$ output port of the first N×N wavelength selective switch 301 or a backup service signal from the $N^{th}$ output port of the second N×N wavelength selective switch 302; and the $N^{th}$ output port of the first N×N wavelength selective switch 301 is an output port except an output port, which is connected to the at least one power combiner, of the first N×N wavelength selective switch 301, and the $N^{th}$ output port of the second N×N wavelength selective switch is an output port except an output port, which is connected to the at least one power combiner, of the second N×N wavelength selective switch 302. Reinforcement of a signal needs to be implemented by using an optical amplifier in a transmission process.

The present invention provides a node apparatus, where two N×N wavelength selective switches are used to form a parallel-connected structure, and power splitters and power combiners are used, so that upload and download of a service can be implemented, thereby transferring route switching selection work originally performed between multiple 1×M wavelength selective switches to the inside of the N×N wavelength selective switch for implementation. Compared with an original structure using discrete components, the node apparatus is simplified, and when a traffic volume expands, the number of module slots on a line side does not need to be increased, thereby reducing usage costs eventually.

Figure 4:
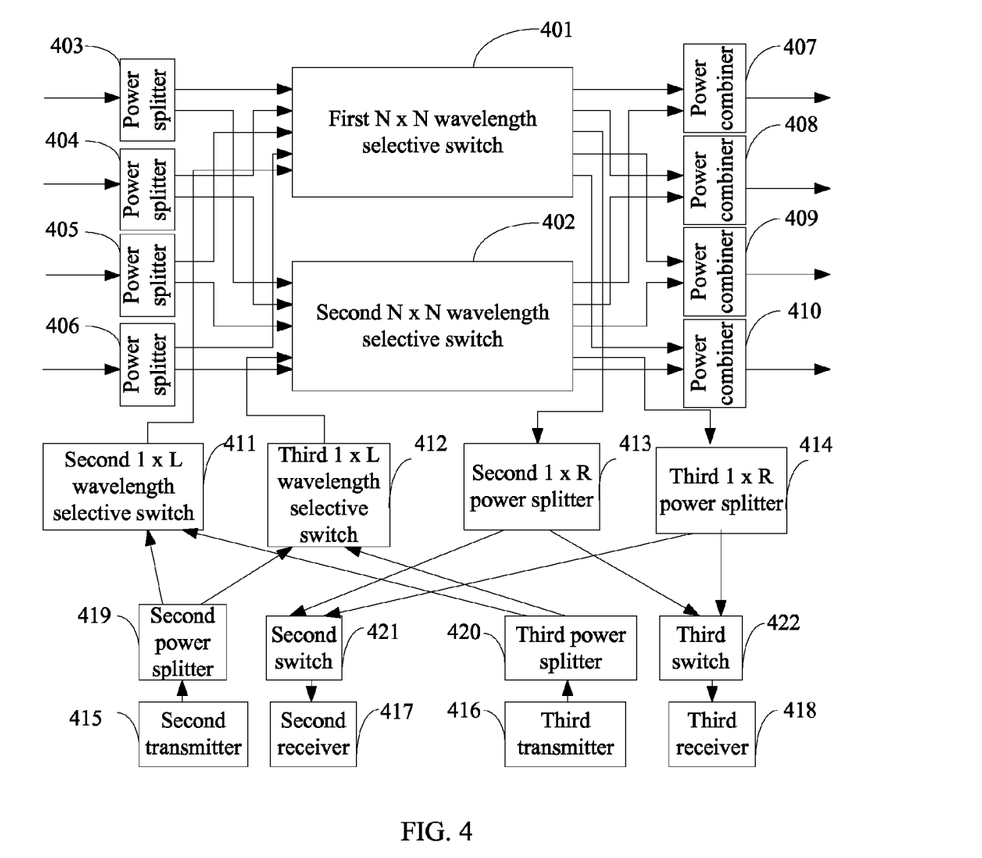
FIG. 4 is a schematic structural diagram of another node apparatus provided by an embodiment of the present invention.

An embodiment of the present invention provides a node apparatus, and as shown in FIG. 4, the node apparatus includes: a first N×N wavelength selective switch 401, a second N×N wavelength selective switch 402, power splitters 404-406, power combiners 407-410, a second 1×L wavelength selective switch 411, a third 1×L wavelength selective switch 412, a second 1×R power splitter 413, and a third 1×R power splitter 414, a second transmitter 415, a third transmitter 416, a second receiver 417, a third receiver 418, a second power splitter 419, a third power splitter 420, a second switch 421, and a third switch 422.

An output end of the second transmitter 415 is connected to an input end of the second power splitter 419, output ends of the second power splitter 419 are separately connected to one port at an input end of the second 1×L wavelength selective switch 411 and one port at an input end of the third 1×L wavelength selective switch 412, an output end of the second 1×L wavelength selective switch 411 is connected to the $N^{th}$ port of the first N×N wavelength selective switch 401, and an output end of the third 1×L wavelength selective switch 412 is connected to the $N^{th}$ port of the second N×N wavelength selective switch 402. The second transmitter 415 is configured to send a service signal, so that the service signal passes through the second power splitter 419, the second 1×L wavelength selective switch 411, and the third 1×L wavelength selective switch 412, and enters the first N×N wavelength selective switch 401 and the second N×N wavelength selective switch 402, where L is a natural number greater than 1.

An output end of the third transmitter 416 is connected to an input end of the third power splitter 420, and output ends of the third power splitter 420 are separately connected to one of remaining ports, except an occupied port, at the input end of the second 1×L wavelength selective switch 411, and one of remaining ports, except an occupied port, at the input end of the third 1×L wavelength selective switch 412; and the third transmitter 416 is configured to send a service signal, so that the service signal passes through the third power splitter 420, the second 1×L wavelength selective switch 411, and the third 1×L wavelength selective switch 412, and enters the first N×N wavelength selective switch 401 and the second N×N wavelength selective switch 402.

An input end of the second 1×R power splitter 413 is connected to the $N^{th}$ port at the output end of the first N×N wavelength selective switch 401, one port at an output end of the second 1×R power splitter 413 is connected to an input end of the second switch 421, an output end of the second switch 421 is connected to an input end of the second receiver 417, and one of remaining ports, except an occupied port, at the output end of the second 1×R power splitter 413 is connected to an input end of the third switch 422. The second receiver 417 is configured to selectively receive, by using the second switch 421, a working service signal from the $N^{th}$ output port of the first N×N wavelength selective switch 401 or a backup service signal from the $N^{th}$ output port of the second N×N wavelength selective switch 402, where R is a natural number greater than 2.

An input end of the third 1×R power splitter 414 is connected to the $N^{th}$ port at an output end of the second N×N wavelength selective switch, one port at an output end of the third 1×R power splitter 414 is connected to a remaining input end, except an occupied end, of the second switch, one of remaining ports, except an occupied port, at the output end of the third 1×R power splitter 414 is connected to a remaining input end, except an occupied end, of the third switch 422, and an output end of the third switch 422 is connected to an input end of the third receiver 418. The third receiver 418 is configured to selectively receive, by using the third switch 422, a backup service signal from the $N^{th}$ output port of the second N×N wavelength selective switch 402 or a working service signal from the $N^{th}$ output port of the first N×N wavelength selective switch 401.

The $N^{th}$ output port of the first N×N wavelength selective switch 401 is an output port except an output port, which is connected to the at least one power combiner, of the first N×N wavelength selective switch 401, and the $N^{th}$ output port of the second N×N wavelength selective switch 402 is an output port except an output port, which is connected to the at least one power combiner, of the second N×N wavelength selective switch 402.

The embodiment of the present invention provides a node apparatus, where two N×N wavelength selective switches are used, and 1×L wavelength selective switches and 1×R power splitters are used in the node apparatus, which implements selective upload and reception of a service signal in the node apparatus. Compared with an original structure using discrete components, the node apparatus is simplified, and when a traffic volume expands, the number of module slots on a line side does not need to be increased, thereby reducing usage costs eventually.

Figure 5A:
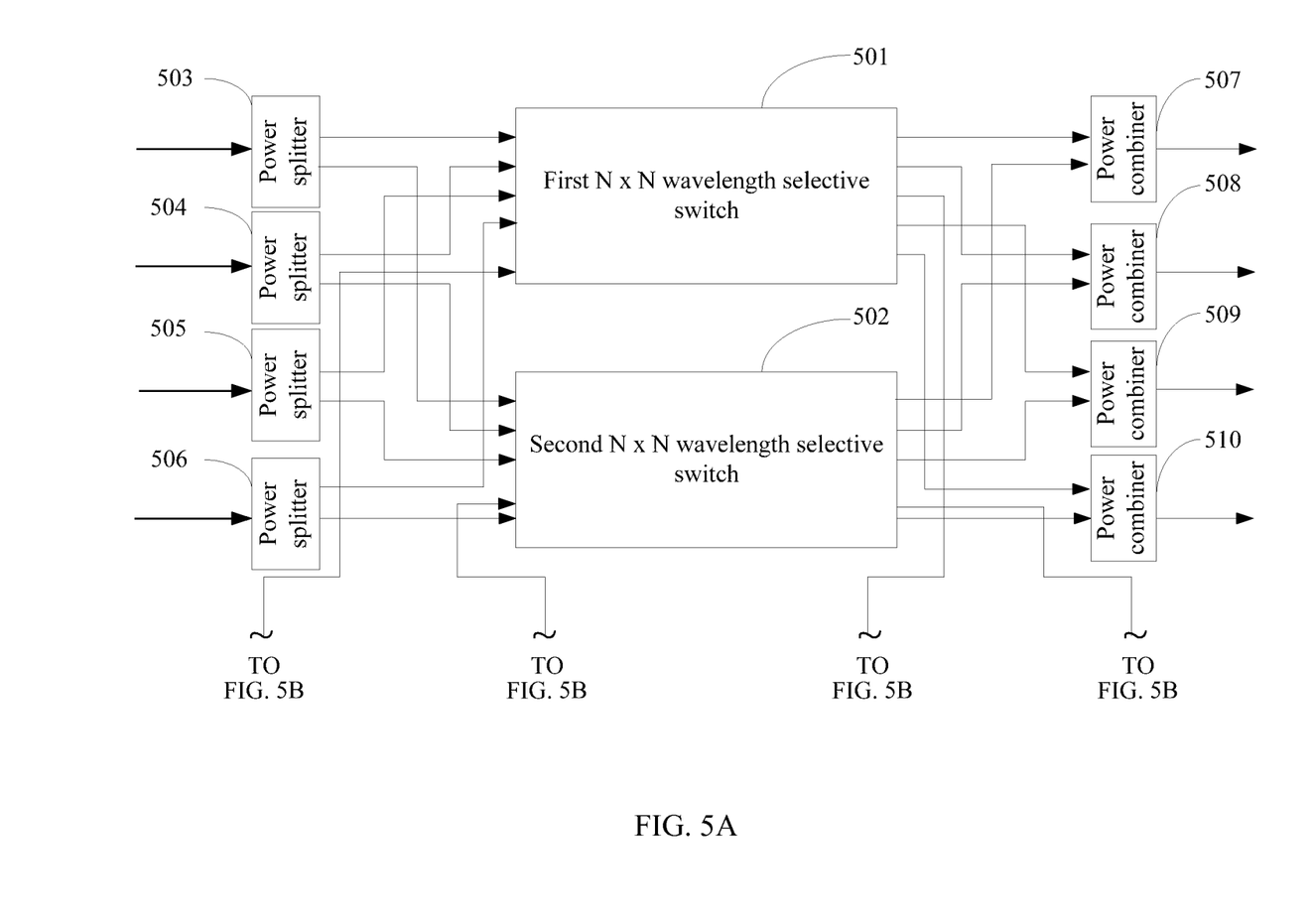
FIG. 5A and FIG. 5B are schematic structural diagrams of a node apparatus provided by another embodiment of the present invention.
Figure 5B:
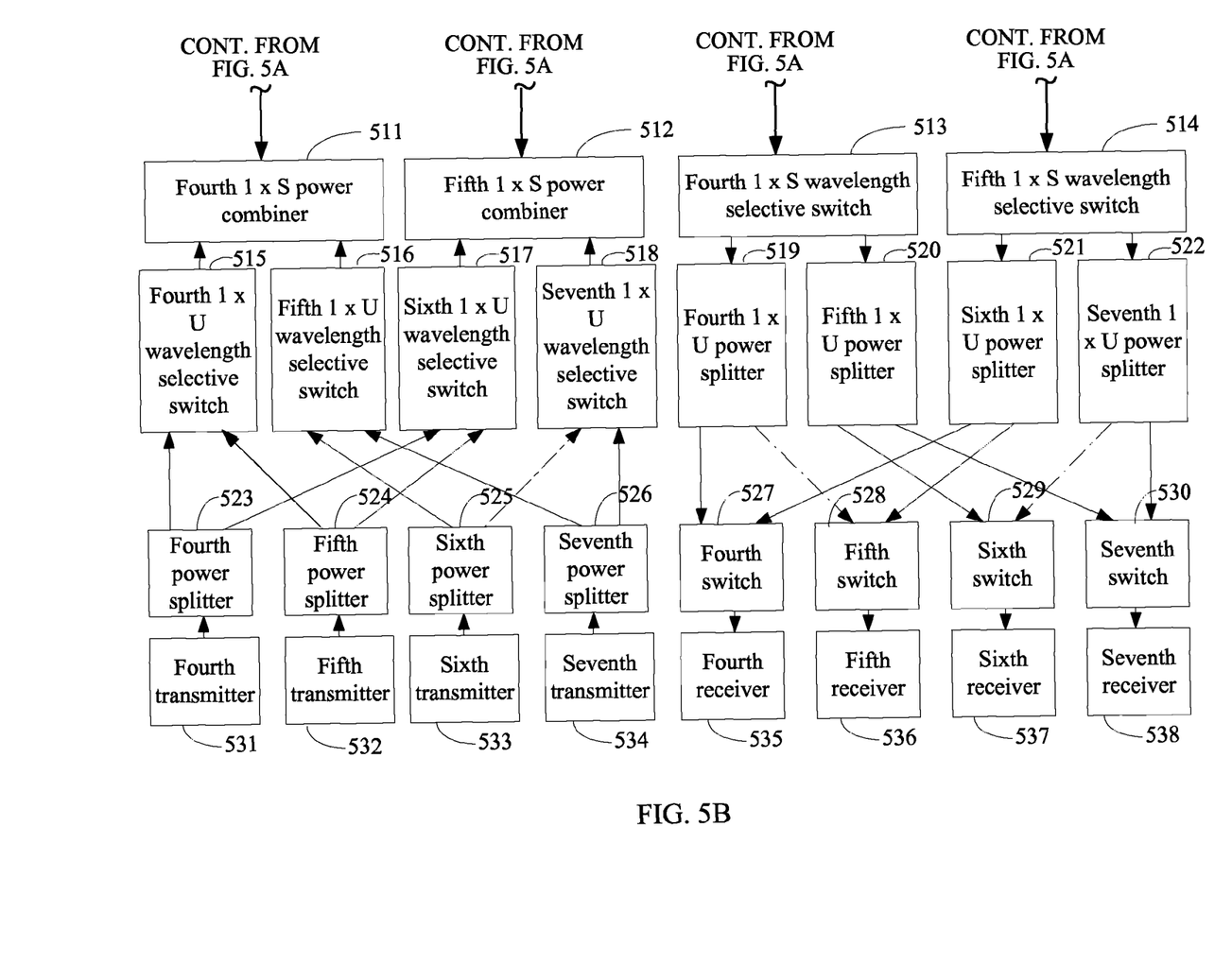

An embodiment of the present invention provides a node apparatus, and as shown in FIG. 5A and FIG. 5B, the node apparatus includes: a first N×N wavelength selective switch 501, a second N×N wavelength selective switch 502, power splitters 505-506, power combiners 507-510, a fourth 1×S power combiner 511, a fifth 1×S power combiner 512, a fourth 1×U wavelength selective switch 515, a fifth 1×U wavelength selective switch 516, a sixth 1×U wavelength selective switch 517, and a seventh 1×U wavelength selective switch 518, a fourth power splitter 523, a fifth power splitter 524, a sixth power splitter 525, a seventh power splitter 526, a fourth transmitter 531, a fifth transmitter 532, a sixth transmitter 533, and a seventh transmitter 534; and a fourth 1×S wavelength selective switch 513, a fifth 1×S wavelength selective switch 514, a fourth 1×U power splitter 519, a fifth 1×U power splitter 520, a sixth 1×U power splitter 521, and a seventh 1×U power splitter 522, a fourth switch 527, a fifth switch 528, a sixth switch 529, a seventh switch 530, a fourth receiver 535, a fifth receiver 536, a sixth receiver 537, and a seventh receiver 538.

An output end of the fourth transmitter 531 is connected to an input end of the fourth power splitter 523, and output ends of the fourth power splitter 523 are separately connected to one port at an input end of the fourth 1×U wavelength selective switch 515 and one port at an input end of the sixth 1×U wavelength selective switch 517; an output end of the fifth transmitter 532 is connected to an input end of the fifth power splitter 524, and output ends of the fifth power splitter 524 are separately connected to one of remaining ports, except an occupied port, at the input end of the fourth 1×U wavelength selective switch 515 and one of remaining ports, except an occupied port, at the input end of the sixth 1×U wavelength selective switch 517; and an output end of the fourth 1×U wavelength selective switch 515 is connected to an input end of the fourth 1×S power combiner 511, an output end of the sixth 1×U wavelength selective switch 517 is connected to an input end of the fifth 1×S power combiner 512, an output end of the fourth 1×S power combiner 511 is connected to the $N^{th}$ port of the first N×N wavelength selective switch 501, and an output end of the fifth 1×S power combiner 512 is connected to the $N^{th}$ port of the second N×N wavelength selective switch 502. The fourth transmitter 531 is configured to send a service signal, so that the service signal passes through the fourth power splitter 523, the fourth 1×U wavelength selective switch 515, and the sixth 1×U wavelength selective switch 517, then separately passes through the fourth 1×S power combiner 511 and the fifth 1×S power combiner 516, and then separately enters the first N×N wavelength selective switch 501 and the second N×N wavelength selective switch 502; and the fifth transmitter 532 is configured to send a service signal, so that the service signal passes through the fifth power splitter 524, the fourth 1×U wavelength selective switch 515, and the sixth 1×U wavelength selective switch 517, then separately passes through the fourth 1×S power combiner 511 and the fifth 1×S power combiner 512, and then separately enters the first N×N wavelength selective switch 501 and the second N×N wavelength selective switch 502, where U is a natural number greater than 1, and S is a natural number greater than 1.

An output end of the sixth transmitter 533 is connected to an input end of the sixth power splitter 525, and output ends of the sixth power splitter 525 are separately connected to one port at an input end of the fifth 1×U wavelength selective switch 516 and one port at an input end of the seventh 1×U wavelength selective switch 518; an output end of the seventh transmitter 534 is connected to an input end of the seventh power splitter 526, and output ends of the seventh power splitter 526 are separately connected to one of remaining ports, except an occupied port, at the input end of the fifth 1×U wavelength selective switch 516 and one of remaining ports, except an occupied port, at the input end of the seventh 1×U wavelength selective switch 518; and an output end of the fifth 1×U wavelength selective switch 516 is connected to one of remaining ports, except an occupied port, at the input end of the fourth 1×S power combiner 511, and an output end of the seventh 1×U wavelength selective switch 518 is connected to one of remaining ports, except an occupied port, at the input end of the fifth 1×S power combiner 512. The sixth transmitter 533 is configured to send a service signal, so that the service signal passes through the sixth power splitter 525, the fifth 1×U wavelength selective switch 516, and the seventh 1×U wavelength selective switch 518, then separately passes through the fourth 1×S power combiner 511 and the fifth 1×S power combiner 512, and then separately enters the first N×N wavelength selective switch 501 and the second N×N wavelength selective switch 502; and the seventh transmitter 534 is configured to send a service signal, so that the service signal passes through the seventh power splitter 526, the fifth 1×U wavelength selective switch 516, and the seventh 1×U wavelength selective switch 518, and then separately passes through the fourth 1×S power combiner 511 and the fifth 1×S power combiner 512 and enters the first N×N wavelength selective switch 501 and the second N×N wavelength selective switch 502.

An input end of the fourth 1×S wavelength selective switch 511 is connected to the $N^{th}$ port at an output end of the first N×N wavelength selective switch 501, one port at an output end of the fourth 1×S wavelength selective switch 511 is connected to an input end of the fourth 1×U power splitter 519, output ends of the fourth 1×U power splitter 519 are separately connected to an input end of the fourth switch 527 and an input end of the fifth switch 528, an output end of the fourth switch 527 is connected to an input end of the fourth receiver 535, and an output end of the fifth switch 528 is connected to an input end of the fifth receiver 536; and another port at the output end of the fourth 1×S wavelength selective switch 513 is connected to an input end of the fifth 1×U power splitter 520, and output ends of the fifth 1×U power splitter 520 are separately connected to an input end of the sixth switch 529 and an input end of the seventh switch 530. The fourth receiver 535 and the fifth receiver 536 are configured to receive a working service signal from the $N^{th}$ output port of the first N×N wavelength selective switch 501 or a backup service signal from the $N^{th}$ output port of the second N×N wavelength selective switch 502.

An input end of the fifth 1×S wavelength selective switch 514 is connected to the $N^{th}$ port at an output end of the second N×N wavelength selective switch 502, one port at an output end of the fifth 1×S wavelength selective switch 514 is connected to an input end of the sixth 1×U power splitter 521, and output ends of the sixth 1×U power splitter 521 are separately connected to a remaining input end, except an occupied end, of the fourth switch 527 and a remaining input end, except an occupied end, of the fifth switch 528; another port at the output end of the fifth 1×S wavelength selective switch 514 is connected to an input end of the seventh 1×U power splitter 522, output ends of the seventh 1×U power splitter 522 are separately connected to a remaining input end, except an occupied end, of the six switch 529 and a remaining input end, except an occupied end, of the seventh switch 530, an output end of the sixth switch 529 is connected to an input end of the sixth receiver 537, and an output end of the seventh switch 530 is connected to an input end of the seventh receiver 538. The sixth receiver 537 and the seventh receiver 538 are configured to receive a working service signal from the $N^{th}$ output port of the first N×N wavelength selective switch 501 or a backup service signal from the $N^{th}$ output port of the second N×N wavelength selective switch 502.

The $N^{th}$ output port of the first N×N wavelength selective switch 501 is an output port except an output port, which is connected to the at least one power combiner, of the first N×N wavelength selective switch 501, and the $N^{th}$ output port of the second N×N wavelength selective switch 502 is an output port except an output port, which is connected to the at least one power combiner, of the second N×N wavelength selective switch 502.

The embodiment of the present invention provides a node apparatus, on a local service upload side, a 1×S power combiner is added between a 1×U wavelength selective switch and an N×N wavelength selective switch, so that a to-be-uploaded signal is sent from a different transmitter, passes through a power splitter and multiple 1×U wavelength selective switches, finally passes through the 1×S power combiner, and then enters the N×N wavelength selective switch; and on a local service download side, a 1×S wavelength selective switch is added between a 1×U power splitter and an N×N wavelength selective switch, so that a to-be-downloaded signal passes through the N×N wavelength selective switch, the 1×S wavelength selective switch, and multiple 1×U power splitters, finally passes through a switch, and is received by a different receiver, thereby implementing route selection of multiple signals. Compared with an original structure using discrete components, the node apparatus is simplified, and when a traffic volume expands, the number of module slots on a line side does not need to be increased, thereby reducing usage costs eventually.

Figure 6A:
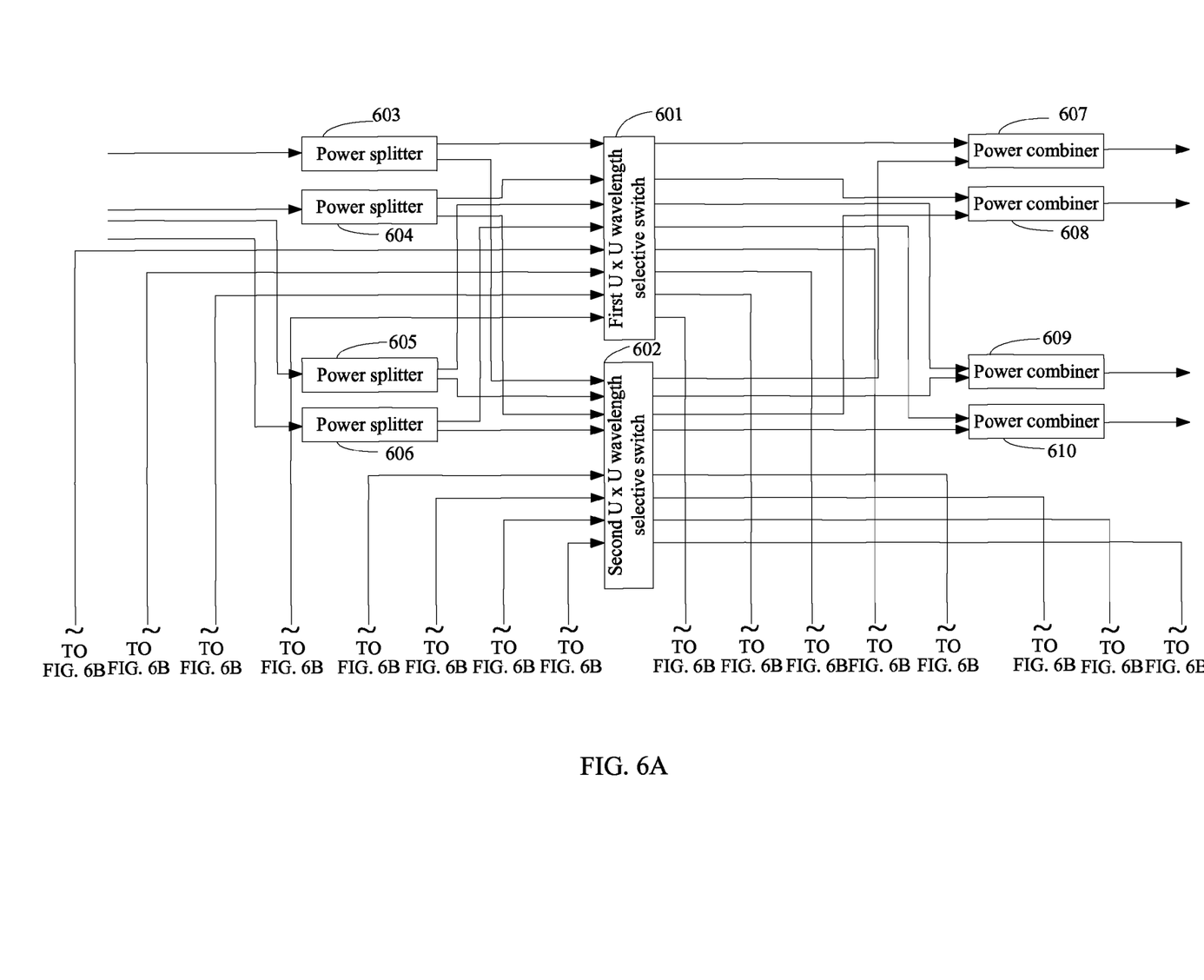
FIG. 6A and FIG. 6B are schematic structural diagrams of another node apparatus provided by another embodiment of the present invention.
Figure 6B:
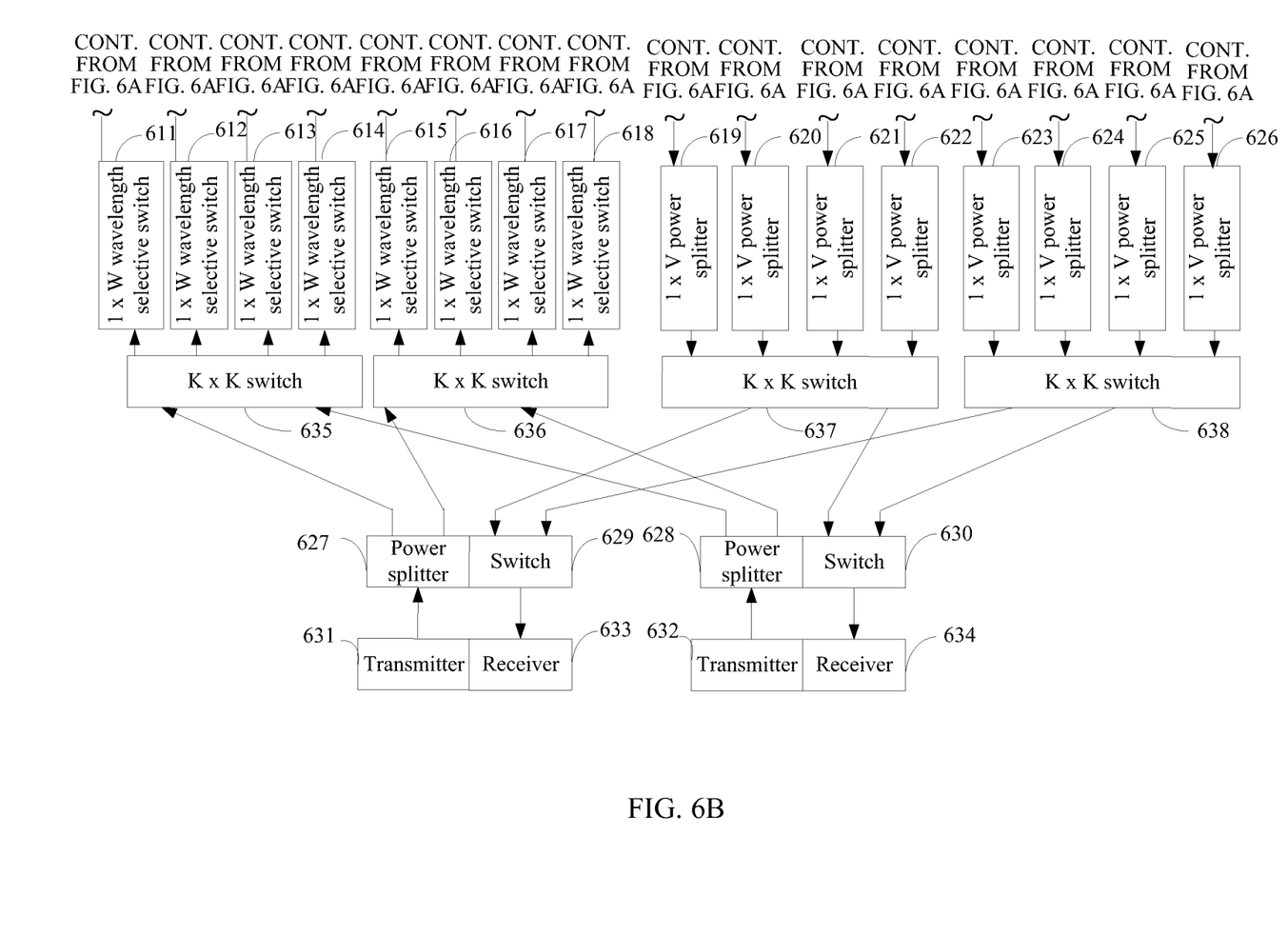

An embodiment of the present invention further provides a node apparatus, and as shown in FIG. 6A and FIG. 6B, the node apparatus includes: a first N×N wavelength selective switch 601, a second N×N wavelength selective switch 602, power splitters 603-606, power combiners 607-610, 1×W wavelength selective switches 611-618, 1×V power splitters 619-626, power splitters 627-628, switches 629-630, transmitters 631-632, and receivers 633-634, where the node apparatus further includes:

upload side K×K switches 635-636, and download side K×K switches 637-638.

The upload side power splitters 627-628 separately send signals, which are sent by the upload side transmitters 631-632, to the at least two upload side K×K switches 635-636, so that the signals, after being selected by the upload side K×K switches 635-636 and passing through the at least two 1×W wavelength selective switches 611-618, are sent to the first N×N wavelength selective switch 601 and the second N×N wavelength selective switch 602.

The at least two 1×V power splitters 619-626 receive the signals from the first N×N wavelength selective switch 601 and the second N×N wavelength selective switch 602, and separately send the signals to the download side K×K switches 637-638, and the signals, after being selected by the download side K×K switches 637-638 and passing through the download side switches 629-630, are separately sent to the download side receivers 633-634, and finally are received by the receivers 633-634, where a value of V is a natural number greater than 1, and a value of K is a natural number greater than 3.

Reinforcement of a signal needs to be implemented by using an optical amplifier in a transmission process. Exemplarily, in the embodiment, N=8, W=20, and V=20. Each K×K switch is connected to four 1×U wavelength selective switches or four 1×S power splitters, and therefore, a value of K in the K×K switch is 80, where only a numerical relationship between the three is represented herein, a value of N is a natural number greater than 2, values of both W and V are natural numbers greater than 1, and a value of K is a natural number greater than 3.

A large number of ports can be simultaneously connected to the foregoing structure, and K×K switches are added on upload and download paths, which can improve selection capabilities of multiple groups of signals, and the node framework is applicable to transmission of a coherent signal.

If the 1×W wavelength selective switches 611-618 in the foregoing node apparatus are replaced with multiplexers, and the 1×V power splitters 619-626 in the foregoing node apparatus are replaced with demultiplexers, a node apparatus after replacement is applicable to transmission of an non-coherent signal.

Further, the node apparatus further includes:

upload side K×K switches 635-636, and download side K×K switches 637-638.

The upload side power splitters 627-628 separately send signals, which are sent by the upload side transmitters 631-632, to the at least two upload side K×K switches 635-636, so that the signals, after being selected by the upload side K×K switches 635-636, are sent to the first N×N wavelength selective switch 601 and the second N×N wavelength selective switch 602, where a value of K is a natural number greater than 1; and the download side K×K switches 637-638 separately receive signals from the first N×N wavelength selective switch 601 and the second N×N wavelength selective switch 602, so that the signals, after being selected by the K×K switches 637-638 and passing through the download side switches 629-630, are separately sent to the download side receivers 633-634, and finally are received by the receivers 633-634, where a value of K is a natural number greater than 1.

In the embodiment of the present invention, K×K switches are added on upload and download paths of a parallel-connected structure formed by two N×N wavelength selective switches, so that a to-be-processed signal can be selected, which can adapt to upload and download of multiple groups of same-wavelength optical signals and implements a non-blocking function. In addition, it can be also ensured that, compared with an original node apparatus using discrete components, a node structure is simplified and costs are reduced.

In the several embodiments provided in this specification, it should be understood that the disclosed method and apparatus may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) to perform some of the steps of the methods described in the embodiments of the present invention. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

What is claimed is:

1. A node apparatus, comprising: a first N×N wavelength selective switch, a second N×N wavelength selective switch, at least one power splitter, and at least one power combiner, wherein:

the first N×N wavelength selective switch and the second N×N wavelength selective switch form a parallel-connected structure, each power splitter has one input end and two output ends, and the two output ends are a first output end and a second output end; the first output end of each power splitter is connected to a different input end of the first N×N wavelength selective switch, and the second output end of each power splitter is connected to a different input end of the second N×N wavelength selective switch; each power combiner has two input ends and one output end, and the two input ends are a first input end and a second input end; and the first input end of each power combiner is connected to one output end of the first N×N wavelength selective switch, and the second input end of each power combiner is connected to one output end of the second N×N wavelength selective switch, wherein N is a natural number greater than 1; and each power splitter sends, using the first output end, a signal comprising a working service and a backup service to the first N×N wavelength selective switch, each power splitter sends, using the second output end, the signal comprising the working service and the backup service to the second N×N wavelength selective switch, the first N×N wavelength selective switch blocks the backup service in the signal, switches the working service, and sends the working service to the power combiner using the first input end of the power combiner, and the second N×N wavelength selective switch blocks the working service in the signal, switches the backup service, and sends the backup service to the power combiner using the second input end of the power combiner.

2. The node apparatus according to claim 1, wherein the node apparatus further comprises:

a first transmitter and a first power splitter, wherein an output end of the first transmitter is connected to an input end of the first power splitter, and output ends of the first power splitter are separately connected to an $N^{th}$ input port of the first N×N wavelength selective switch and an $N^{th}$ input port of the second N×N wavelength selective switch; the first transmitter is configured to send a service signal, so that the service signal enters the first power splitter, and separately enters the $N^{th}$ input port of the first N×N wavelength selective switch and the $N^{th}$ input port of the second N×N wavelength selective switch from the output ends of the first power splitter; and the $N^{th}$ input port of the first N×N wavelength selective switch is an input port other than an input port which is connected to the at least one power splitter, of the first N×N wavelength selective switch, and the $N^{th}$ input port of the second N×N wavelength selective switch is an input port other than an input port, which is connected to the at least one power splitter, of the second N×N wavelength selective switch.

3. The node apparatus according to claim 1, wherein the node apparatus further comprises:

a first receiver and a first switch, wherein two input ends of the first switch are separately connected to an $N^{th}$ output port of the first N×N wavelength selective switch and an $N^{th}$ output port of the second N×N wavelength selective switch, an input end of the first receiver is connected to an output end of the first switch, the first receiver is configured to receive a working service signal from the $N^{th}$ output port of the first N×N wavelength selective switch or a backup service signal from the $N^{th}$ output port of the second N×N wavelength selective switch; and the $N^{th}$ output port of the first N×N wavelength selective switch is an output port other than an output port, which is connected to the at least one power combiner, of the first N×N wavelength selective switch, and the $N^{th}$ output port of the second N×N wavelength selective switch is an output port other than an output port, which is connected to the at least one power combiner, of the second N×N wavelength selective switch.

4. The node apparatus according to claim 1, wherein the node apparatus further comprises:

a second transmitter, a third transmitter, a second receiver, a third receiver, a second power splitter, a third power splitter, a second switch, a third switch, a second 1×L wavelength selective switch, a third 1×L wavelength selective switch, a second 1×R power splitter, and a third 1×R power splitter, wherein an output end of the second transmitter is connected to an input end of the second power splitter, output ends of the second power splitter are separately connected to one port at an input end of the second 1×L wavelength selective switch and one port at an input end of the third 1×L wavelength selective switch, an output end of the second 1×L wavelength selective switch is connected to an $N^{th}$ port of the first N×N wavelength selective switch, and an output end of the third 1×L wavelength selective switch is connected to an $N^{th}$ port of the second N×N wavelength selective switch; and the second transmitter is configured to send a service signal, wherein the service signal passes through the second power splitter, the second 1×L wavelength selective switch and the third 1×L wavelength selective switch, and enters the first N×N wavelength selective switch and the second N×N wavelength selective switch, wherein L is a natural number greater than 1;

an output end of the third transmitter is connected to an input end of the third power splitter, output ends of the third power splitter are separately connected to one of the remaining ports, other than an occupied port, at the input end of the second 1×L wavelength selective switch, and one of remaining ports, other than an occupied port, at the input end of the third 1×L wavelength selective switch; and the third transmitter is configured to send a service signal, wherein the service signal passes through the third power splitter, the second 1×L wavelength selective switch, and the third 1×L wavelength selective switch, and enters the first N×N wavelength selective switch and the second N×N wavelength selective switch;

an input end of the second 1×R power splitter is connected to an $N^{th}$ output port of the first N×N wavelength selective switch, one port at an output end of the second 1×R power splitter is connected to an input end of the second switch, an output end of the second switch is connected to an input end of the second receiver, and one of remaining ports, other than an occupied port, at the output end of the second 1×R power splitter is connected to an input end of the third switch; and the second receiver is configured to selectively receive, using the second switch, a working service signal from the $N^{th}$ output port of the first N×N wavelength selective switch or a backup service signal from an $N^{th}$ output port of the second N×N wavelength selective switch, wherein R is a natural number greater than 1;

an input end of the third 1×R power splitter is connected to the $N^{th}$ output port of the second N×N wavelength selective switch, one port at an output end of the third 1×R power splitter is connected to a remaining input end, other than an occupied end, of the second switch, one of remaining ports, other than an occupied port, at the output end of the third 1×R power splitter is connected to a remaining input end, other than an occupied end, of the third switch, and an output end of the third switch is connected to an input end of the third receiver; and the third receiver is configured to selectively receive, using the third switch, a backup service signal from the $N^{th}$ output port of the second N×N wavelength selective switch or a working service signal from the $N^{th}$ output port of the first N×N wavelength selective switch; and the $N^{th}$ output port of the first N×N wavelength selective switch is an output port other than an output port, which is connected to the at least one power combiner, of the first N×N wavelength selective switch, and the $N^{th}$ output port of the second N×N wavelength selective switch is an output port other than an output port, which is connected to the at least one power combiner, of the second N×N wavelength selective switch.

5. The node apparatus according to claim 1, wherein the node apparatus further comprises:

a fourth transmitter, a fifth transmitter, a sixth transmitter, a seventh transmitter, a fourth power splitter, a fifth power splitter, a sixth power splitter, a seventh power splitter, a fourth 1×S power combiner, a fifth 1×S power combiner, a fourth 1×U wavelength selective switch, a fifth 1×U wavelength selective switch, a sixth 1×U wavelength selective switch, and a seventh 1×U wavelength selective switch; and a fourth receiver, a fifth receiver, a sixth receiver, a seventh receiver, a fourth switch, a fifth switch, a sixth switch, a seventh switch, a fourth 1×S wavelength selective switch, a fifth 1×S wavelength selective switch, a fourth 1×U power splitter, a fifth 1×U power splitter, a sixth 1×U power splitter, and a seventh 1×U power splitter, wherein an output end of the fourth transmitter is connected to an input end of the fourth power splitter, and output ends of the fourth power splitter are separately connected to one port at an input end of the fourth 1×U wavelength selective switch and one port at an input end of the sixth 1×U wavelength selective switch; an output end of the fifth transmitter is connected to an input end of the fifth power splitter, and output ends of the fifth power splitter are separately connected to one of remaining ports, other than an occupied port, at the input end of the fourth 1×U wavelength selective switch and one of remaining ports, other than an occupied port, at the input end of the sixth 1×U wavelength selective switch; an output end of the fourth 1×U wavelength selective switch is connected to an input end of the fourth 1×S power combiner, an output end of the sixth 1×U wavelength selective switch is connected to an input end of the fifth 1×S power combiner, an output end of the fourth 1×S power combiner is connected to an $N^{th}$ port of the first N×N wavelength selective switch, and an output end of the fifth 1×S power combiner is connected to an $N^{th}$ port of the second N×N wavelength selective switch; and the fourth transmitter is configured to send a service signal, wherein the service signal passes through the fourth power splitter, the fourth 1×U wavelength selective switch and the sixth 1×U wavelength selective switch, then separately passes through the fourth 1×S power combiner and the fifth 1×S power combiner, and then separately enters the first N×N wavelength selective switch and the second N×N wavelength selective switch, and the fifth transmitter is configured to send a service signal, wherein the service signal passes through the fifth power splitter, the fourth 1×U wavelength selective switch and the sixth 1×U wavelength selective switch, then separately passes through the fourth 1×S power combiner and the fifth 1×S power combiner, and then separately enters the first N×N wavelength selective switch and the second N×N wavelength selective switch, wherein U is a natural number greater than 1, and S is a natural number greater than 1;

an output end of the sixth transmitter is connected to an input end of the sixth power splitter, and output ends of the sixth power splitter are separately connected to one port at an input end of the fifth 1×U wavelength selective switch and one port at an input end of the seventh 1×U wavelength selective switch; an output end of the seventh transmitter is connected to an input end of the seventh power splitter, and output ends of the seventh power splitter are separately connected to one of remaining ports, other than an occupied port, at the input end of the fifth 1×U wavelength selective switch and one of remaining ports, other than an occupied port, at the input end of the seventh 1×U wavelength selective switch; an output end of the fifth 1×U wavelength selective switch is connected to one of remaining ports, other than an occupied port, at the input end of the fourth 1×S power combiner, an output end of the seventh 1×U wavelength selective switch is connected to one of remaining ports, other than an occupied port, at the input end of the fifth 1×S power combiner; and the sixth transmitter is configured to send a service signal, wherein the service signal passes through the sixth power splitter, the fifth 1×U wavelength selective switch and the seventh 1×U wavelength selective switch, then separately passes through the fourth 1×S power combiner and the fifth 1×S power combiner, and then enters the first N×N wavelength selective switch and the second N×N wavelength selective switch, and the seventh transmitter is configured to send a service signal, wherein the service signal passes through the seventh power splitter, the fifth 1×U wavelength selective switch, and the seventh 1×U wavelength selective switch, and then separately passes through the fourth 1×S power combiner and the fifth 1×S power combiner and enters the first N×N wavelength selective switch and the second N×N wavelength selective switch;

an input end of the fourth 1×S wavelength selective switch is connected to the $N^{th}$ port at an output end of the first N×N wavelength selective switch, one port at an output end of the fourth 1×S wavelength selective switch is connected to an input end of the fourth 1 x U power splitter, output ends of the fourth 1×U power splitter are separately connected to an input end of the fourth switch and an input end of the fifth switch, an output end of the fourth switch is connected to an input end of the fourth receiver, and an output end of the fifth switch is connected to an input end of the fifth receiver; another port at the output end of the fourth 1×S wavelength selective switch is connected to an input end of the fifth 1×U power splitter, and output ends of the fifth 1×U power splitter are separately connected to an input end of the sixth switch and an input end of the seventh switch; and the fourth receiver and the fifth receiver are configured to receive a working service signal from the $N^{th}$ output port of the first N×N wavelength selective switch or a backup service signal from the $N^{th}$ output port of the second N×N wavelength selective switch;

an input end of the fifth 1×S wavelength selective switch is connected to the $N^{th}$ output port of the second N×N wavelength selective switch, one port at an output end of the fifth 1×S wavelength selective switch is connected to an input end of the sixth 1×U power splitter, and output ends of the sixth 1×U power splitter are separately connected to a remaining input end, other than an occupied end, of the fourth switch and a remaining input end, other than an occupied end, of the fifth switch; another port at the output end of the fifth 1×S wavelength selective switch is connected to an input end of the seventh 1×U power splitter, output ends of the seventh 1×U power splitter are separately connected to a remaining input end, other than an occupied end, of the six switch and a remaining input end, other than an occupied end, of the seventh switch, an output end of the sixth switch is connected to an input end of the sixth receiver, and an output end of the seventh switch is connected to an input end of the seventh receiver; and the sixth receiver and the seventh receiver are configured to receive the working service signal from the $N^{th}$ output port of the first N×N wavelength selective switch or the backup service signal from the $N^{th}$ output port of the second N×N wavelength selective switch; and the $N^{th}$ output port of the first N×N wavelength selective switch is an output port other than an output port, which is connected to the at least one power combiner, of the first N×N wavelength selective switch, and the $N^{th}$ output port of the second N×N wavelength selective switch is an output port other than an output port, which is connected to the at least one power combiner, of the second N×N wavelength selective switch.

6. The node apparatus according to claim 1, wherein the node apparatus further comprises:

at least two upload side transmitters, at least two upload side power splitters, at least two upload side K×K switches, at least two download side receivers, at least two download side switches, at least two download side K×K switches, at least two 1×W wavelength selective switches, and at least two 1×V power splitters, wherein the upload side power splitters separately send, to the at least two upload side K×K switches, signals sent by the upload side transmitters, wherein the signals, after being selected by the upload side K×K switches and after passing through the at least two 1×W wavelength selective switches, are sent to the first N×N wavelength selective switch and the second N×N wavelength selective switch; and the at least two 1×V power splitters receive the signals from the first N×N wavelength selective switch and the second N×N wavelength selective switch, and separately send the signals to the download side K×K switches, and the signals, after being selected by the download side K×K switches and after passing through the download side switches, are separately sent to the download side receivers, and are received by the download side receivers, wherein a value of W is a natural number greater than 1, a value of V is a natural number greater than 1, and a value of K is a natural number greater than 3.

7. The node apparatus according to claim 1, wherein the node apparatus further comprises:
   at least two upload side transmitters, at least two upload side power splitters, at least two upload side K×K switches, at least two download side receivers, at least two download side switches, and at least two download side K×K switches, wherein
   the upload side power splitters separately send, to the at least two upload side K×K switches, signals sent by the upload side transmitters, wherein the signals, after being selected by the upload side K×K switches, are sent to the first N×N wavelength selective switch and the second N×N wavelength selective switch, wherein a value of K is a natural number greater than 1; and
   the download side K×K switches separately receive the signals from the first N×N wavelength selective switch and the second N×N wavelength selective switch, wherein the signals, after being selected by the K×K switches and after passing through the download side switches, are separately sent to the download side receivers, and are received by the download side receivers, wherein a value of K is a natural number greater than 1.

* * * * *